United States Patent
Nilsson

(10) Patent No.: US 11,196,475 B2
(45) Date of Patent: Dec. 7, 2021

(54) DEVICE-SPECIFIC BEAM MANAGEMENT OF A WIRELESS DEVICE

(71) Applicant: Telefonaktiebolaget LM Ericsson (publ), Stockholm (SE)

(72) Inventor: Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 47 days.

(21) Appl. No.: 15/523,146

(22) PCT Filed: Apr. 10, 2017

(86) PCT No.: PCT/EP2017/058518
§ 371 (c)(1),
(2) Date: Apr. 28, 2017

(87) PCT Pub. No.: WO2018/188718
PCT Pub. Date: Oct. 18, 2018

(65) Prior Publication Data
US 2018/0294863 A1    Oct. 11, 2018

(51) Int. Cl.
*H04L 5/00* (2006.01)
*H04B 7/0408* (2017.01)
(Continued)

(52) U.S. Cl.
CPC ......... *H04B 7/0695* (2013.01); *H04B 7/0408* (2013.01); *H04B 7/0617* (2013.01);
(Continued)

(58) Field of Classification Search
CPC ............ H04W 16/28; H04W 52/0216; H04W 72/046; H04W 72/085; H04W 76/28;
(Continued)

(56) References Cited

U.S. PATENT DOCUMENTS

| 2007/0142067 A1* | 6/2007 | Cheng | H04L 5/0007 455/512 |
| 2012/0182895 A1* | 7/2012 | Jwa | H04W 72/046 370/252 |

(Continued)

FOREIGN PATENT DOCUMENTS

| WO | 2017/014572 A1 | 1/2017 |
| WO | 2017034445 A1 | 3/2017 |

OTHER PUBLICATIONS

International Search Report and Written Opinion issued in International Application No. PCT/EP2017/058518, dated Dec. 18, 2017, 15 pages.

(Continued)

*Primary Examiner* — Michael Thier
*Assistant Examiner* — Prince A Mensah
(74) *Attorney, Agent, or Firm* — Rothwell, Figg, Ernst & Manbeck, P.C.

(57) ABSTRACT

There is provided mechanisms for device-specific beam management of a wireless device in a communications system having a system bandwidth. A method is performed by a network node. The method comprises estimating frequency scheduling of the wireless device. The frequency scheduling is to be used for data communications with the wireless device. The method comprises determining which frequency resources to use for transmission of reference signals to the wireless device. The frequency resources match the estimated frequency scheduling and span less than the entire system bandwidth. The method comprises transmitting the reference signals in the determined frequency resources as part of device-specific beam management of the wireless device.

24 Claims, 6 Drawing Sheets

(51) Int. Cl.
*H04B 7/06* (2006.01)
*H04B 7/08* (2006.01)
*H04W 72/04* (2009.01)
*H04W 24/10* (2009.01)
*H04W 16/28* (2009.01)

(52) U.S. Cl.
CPC ........... *H04B 7/0619* (2013.01); *H04B 7/088* (2013.01); *H04L 5/0048* (2013.01); *H04L 5/0051* (2013.01); *H04W 16/28* (2013.01); *H04W 24/10* (2013.01); *H04W 72/0446* (2013.01); *H04L 5/0007* (2013.01)

(58) Field of Classification Search
CPC .......................... H04W 24/10; H04W 72/0446; H04L 5/0005; H04L 5/0007; H04L 5/0048; H04L 5/0051; H04B 7/0408; H04B 7/0695; H04B 7/0617; H04B 7/0619; H04B 7/088
See application file for complete search history.

(56) References Cited

U.S. PATENT DOCUMENTS

| | | | | |
|---|---|---|---|---|
| 2013/0064119 | A1* | 3/2013 | Montojo | H04W 36/0061 370/252 |
| 2013/0156120 | A1* | 6/2013 | Josiam | H04L 5/0023 375/260 |
| 2015/0289281 | A1* | 10/2015 | Kim | H04L 5/0023 375/267 |
| 2015/0341097 | A1* | 11/2015 | Yang | H04B 7/0617 370/329 |
| 2016/0028448 | A1* | 1/2016 | Park | H04B 7/0639 375/267 |
| 2016/0029238 | A1* | 1/2016 | Chen | H04W 24/10 370/252 |
| 2016/0088594 | A1* | 3/2016 | Xiong | H04W 4/70 370/329 |
| 2017/0063436 | A1* | 3/2017 | Li | H04W 24/10 |
| 2017/0257884 | A1* | 9/2017 | Rahman | H04B 7/0626 |
| 2017/0295508 | A1* | 10/2017 | Stirling-Gallacher | H04L 5/0035 |
| 2017/0302352 | A1* | 10/2017 | Islam | H04B 7/0626 |
| 2017/0303263 | A1* | 10/2017 | Islam | H04B 7/0408 |
| 2017/0353254 | A1* | 12/2017 | Islam | H01Q 3/2605 |
| 2018/0041319 | A1* | 2/2018 | Cheng | H04L 5/0048 |
| 2018/0063868 | A1* | 3/2018 | Abedini | H04L 43/0894 |
| 2018/0212666 | A1* | 7/2018 | Kim | H04B 7/04 |
| 2018/0220398 | A1* | 8/2018 | John Wilson | H04B 17/318 |
| 2018/0270700 | A1* | 9/2018 | Babaei | H04W 28/0278 |
| 2018/0287683 | A1* | 10/2018 | Subramanian | H04B 7/0626 |

OTHER PUBLICATIONS

Huawei, et al., "CSI-RS design for beam management", 3GPP TSG RAN WG1 Meeting #88bis, RI-1704235, Spokane, USA, Apr. 3-7, 2017, 9 pages.

* cited by examiner

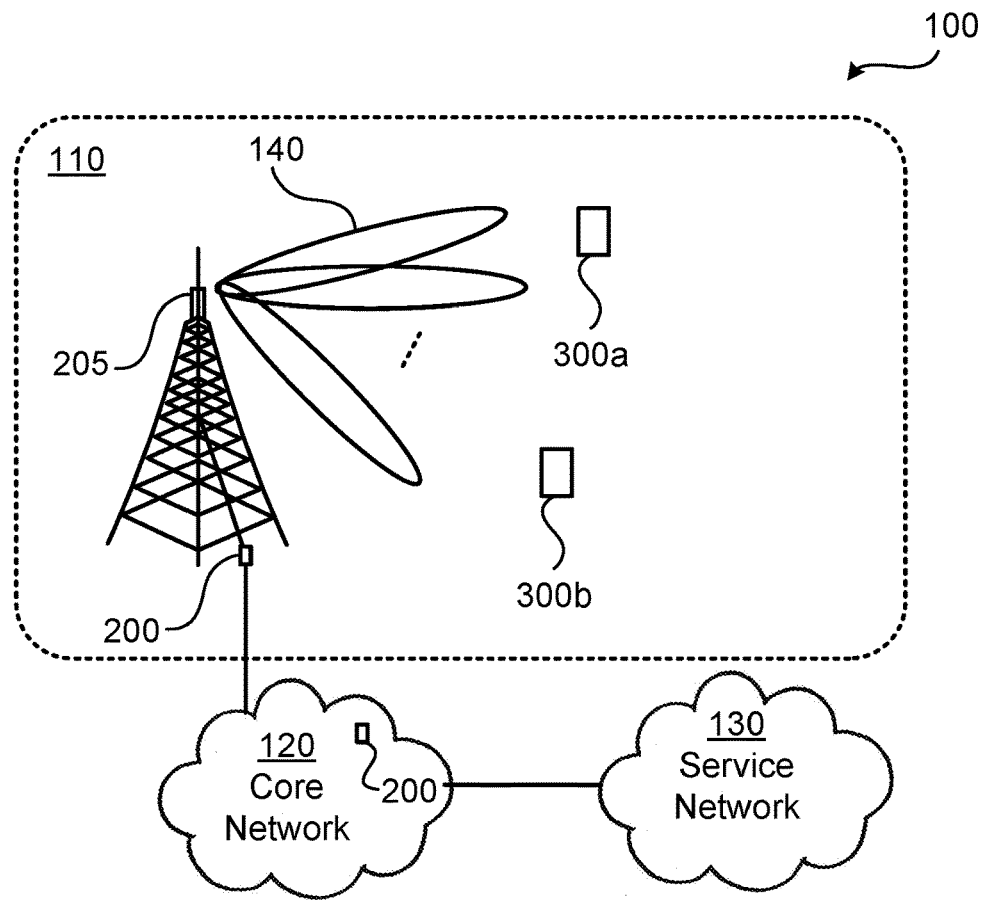
Fig. 1
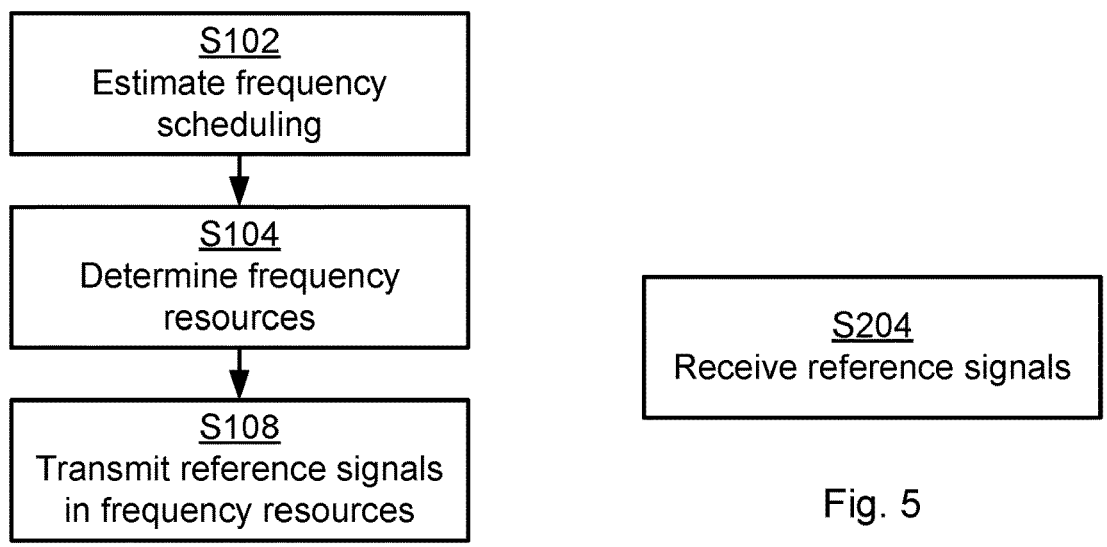
Fig. 3
Fig. 5

DEVICE-SPECIFIC BEAM MANAGEMENT OF A WIRELESS DEVICE

CROSS REFERENCE TO RELATED APPLICATION(S)

This application is a 35 U.S.C. § 371 National Stage of International Patent Application No. PCT/EP2017/058518, filed Apr. 10, 2017, designating the United States, the disclosure of which is incorporated by reference.

TECHNICAL FIELD

Embodiments presented herein relate to methods, a network node, a wireless device, computer programs, and a computer program product for device-specific beam management of a wireless device in a communications system.

BACKGROUND

In communications networks, there may be a challenge to obtain good performance and capacity for a given communications protocol, its parameters and the physical environment in which the communications network is deployed.

For example, transmission and reception schemes based on using narrow beam transmission and reception might be needed at comparatively high carrier frequencies to compensate for comparatively high propagation losses that might be present for transmission and reception using such high carrier frequencies. In a communications network where the transmission and reception point (TRP) of the network node at the network side uses narrow beams for transmission one of the narrow transmission beams is assumed to be discovered and monitored for each served wireless device at the user side. This process of discovering and monitoring is referred to as beam management.

In order to perform beam management the network node uses measurements, as obtained and reported by the served wireless devices, on downlink reference signals such as channel state information reference signals (CSI-RS). For wideband sounding purposes the reference signals are commonly transmitted such that they span the entire system bandwidth. Further, the reference signals can be transmitted periodically, semi-persistently or aperiodically (such as when being event triggered) and they can be either shared between multiple wireless devices (users) or be user-specific.

In order for a wireless device to find a suitable transmission beam the network node could transmit CSI-RS in different transmission beams on which the wireless device performs measurements and reports back the N≥1 best transmission beams (where the value of N can be configured by the network node). Furthermore, the CSI-RS transmission in a given transmission beam can be repeated to allow the wireless device to evaluate suitable reception beam as used by the wireless device.

The beam pair for which the highest received reference signal power was obtained is then used as the active beam pair link. In general terms, a beam pair is defined by a transmission beam at the transmitting end (such as at the TRP) and a corresponding reception beam at the receiving end (such as at the wireless device), where the transmission beam and the reception beam are selected from sets of available candidate beams so as to maximize a quality criterion (such as highest received reference signal power) for transmission from the transmitting end to the receiving end.

The beam management procedure thus involves to discover and maintain beam pair links. In case of reciprocity, the beam pair link found from downlink reference signals can be applied also for uplink data transmission.

However, there is still a need for an improved beam management.

SUMMARY

An object of embodiments herein is to provide efficient device-specific beam management.

According to a first aspect there is presented a method for device-specific beam management of a wireless device in a communications system having a system bandwidth. The method is performed by a network node. The method comprises estimating frequency scheduling of the wireless device. The frequency scheduling is to be used for data communications with the wireless device. The method comprises determining which frequency resources to use for transmission of reference signals to the wireless device. The frequency resources match the estimated frequency scheduling and span less than the entire system bandwidth. The method comprises transmitting the reference signals in the determined frequency resources as part of device-specific beam management of the wireless device.

According to a second aspect there is presented a network node for device-specific beam management of a wireless device in a communications system having a system bandwidth. The network node comprises processing circuitry. The processing circuitry is configured to cause the network node to estimate frequency scheduling of the wireless device. The frequency scheduling is to be used for data communications with the wireless device. The processing circuitry is configured to cause the network node to determine which frequency resources to use for transmission of reference signals to the wireless device. The frequency resources match the estimated frequency scheduling and span less than the entire system bandwidth. The processing circuitry is configured to cause the network node to transmit the reference signals in the determined frequency resources as part of device-specific beam management of the wireless device.

According to a third aspect there is presented a network node for device-specific beam management of a wireless device in a communications system having a system bandwidth. The network node comprises processing circuitry and a storage medium. The storage medium stores instructions that, when executed by the processing circuitry, cause the network node to perform operations, or steps. The operations, or steps, cause the network node to estimate frequency scheduling of the wireless device. The frequency scheduling is to be used for data communications with the wireless device. The operations, or steps, cause the network node to determine which frequency resources to use for transmission of reference signals to the wireless device. The frequency resources match the estimated frequency scheduling and span less than the entire system bandwidth. The operations, or steps, cause the network node to transmit the reference signals in the determined frequency resources as part of device-specific beam management of the wireless device.

According to a fourth aspect there is presented a network node for device-specific beam management of a wireless device in a communications system having a system bandwidth. The network node comprises an estimate module configured to estimate frequency scheduling of the wireless device. The frequency scheduling is to be used for data communications with the wireless device. The network node comprises a determine module configured to determine which frequency resources to use for transmission of reference signals to the wireless device. The frequency resources match the estimated frequency scheduling and span less than the entire system bandwidth. The network node comprises a transmit module configured to transmit the reference signals in the determined frequency resources as part of device-specific beam management of the wireless device.

According to a fifth aspect there is presented a computer program for device-specific beam management of a wireless device in a communications system having a system bandwidth. The computer program comprises computer program code which, when run on processing circuitry of a network node, causes the network node to perform a method according to the first aspect.

According to a sixth aspect there is presented a method for device-specific beam management of a wireless device in a communications system having a system bandwidth. The method is performed by the wireless device. The method comprises receiving reference signals from a network node as part of device-specific beam management of the wireless device. The reference signals only are received in frequency resources that span less than the entire system bandwidth and match an estimated frequency scheduling of the wireless device for data communications with the network node.

According to a seventh aspect there is presented a wireless device for device-specific beam management of the wireless device in a communications system having a system bandwidth. The wireless device comprises processing circuitry. The processing circuitry is configured to cause the wireless device to receive reference signals from a network node as part of device-specific beam management of the wireless device. The reference signals only are received in frequency resources that span less than the entire system bandwidth and match an estimated frequency scheduling of the wireless device for data communications with the network node.

According to an eighth aspect there is presented a wireless device for device-specific beam management of the wireless device in a communications system having a system bandwidth. The wireless device comprises processing circuitry and a storage medium. The storage medium stores instructions that, when executed by the processing circuitry, cause the wireless device to perform operations, or steps. The operations, or steps, cause the wireless device to receive reference signals from a network node as part of device-specific beam management of the wireless device. The reference signals only are received in frequency resources that span less than the entire system bandwidth and match an estimated frequency scheduling of the wireless device for data communications with the network node.

According to a ninth aspect there is presented a wireless device for device-specific beam management of the wireless device in a communications system having a system bandwidth. The wireless device comprises a receive module configured to receive reference signals from a network node as part of device-specific beam management of the wireless device. The reference signals only are received in frequency resources that span less than the entire system bandwidth and match an estimated frequency scheduling of the wireless device for data communications with the network node.

According to a tenth aspect there is presented a computer program for device-specific beam management of a wireless device in a communications system having a system bandwidth, the computer program comprising computer program code which, when run on processing circuitry of the wireless device, causes the wireless device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these network nodes, these wireless devices, and these computer programs provide efficient device-specific beam management of the wireless device.

Advantageously these methods, these network nodes, these wireless devices, and these computer programs enable accurate beams to be found at both the network node and the wireless device in both downlink and uplink for the expected scheduled frequency band.

Advantageously, due to the fact that the frequency band used for the transmission of reference signals is reduced (since the frequency resources in which the reference signals are received span less than the entire system bandwidth) these methods, these network nodes, these wireless devices, and these computer programs either enable a reduction in generated network interference (assuming that the outputted power for the actual frequency resources used for the reference signals is not changed) or enable an improvement in link budget and thus improves the channel estimation as performed by the wireless device (assuming that the total outputted power is concentrated only to the frequency resources that are actually used for the reference signals).

It is to be noted that any feature of the first, second, third, fourth, fifth, sixth seventh, eight, ninth, tenth and eleventh aspects may be applied to any other aspect, wherever appropriate. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communication system according to embodiments;

FIGS. 3, 4, 5, and 6 are flowcharts of methods according to embodiments;

DETAILED DESCRIPTION

Figure 2:
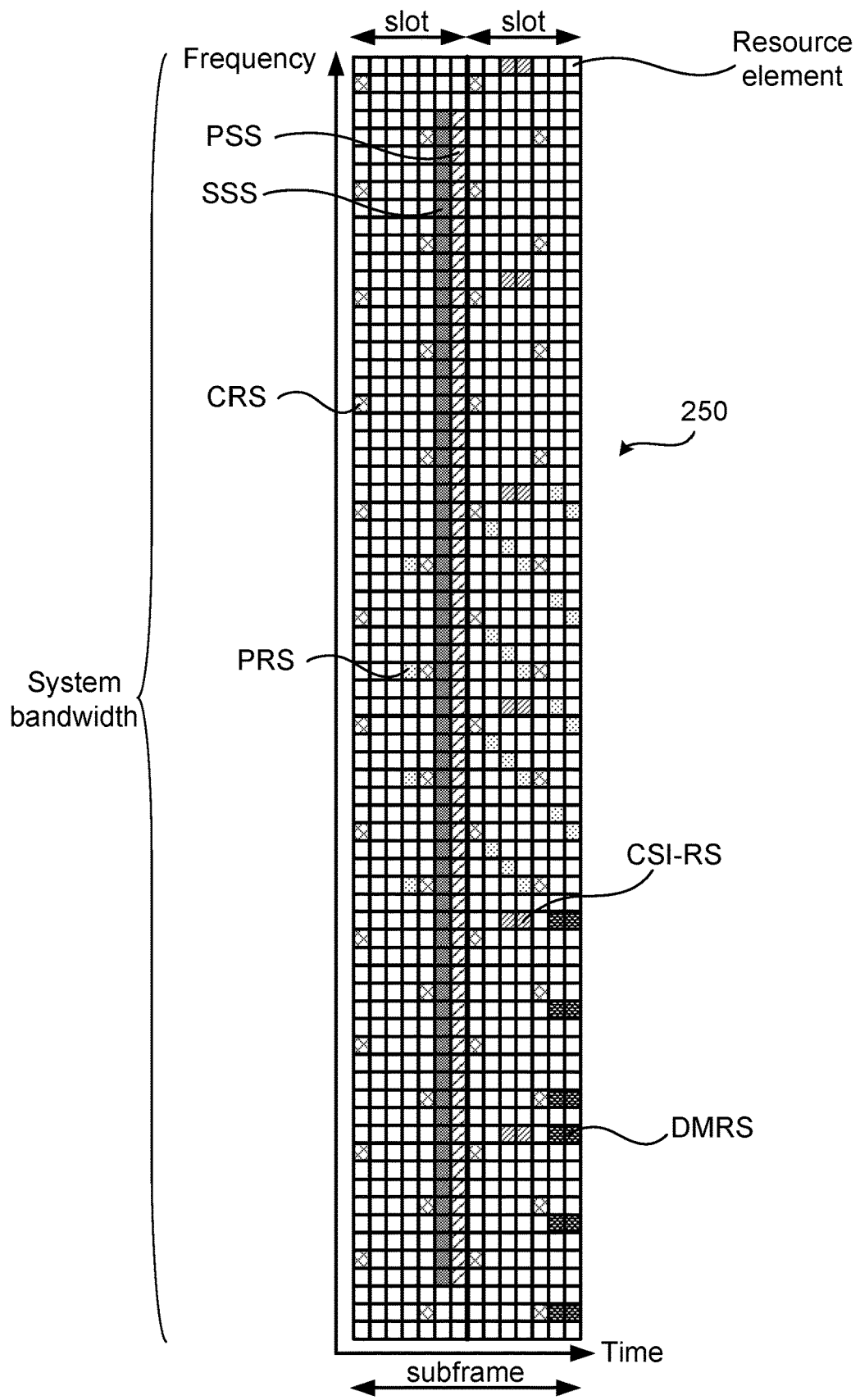
FIG. 2 is a schematic illustration of allocation of reference signals in a time/frequency grid according to state of the art.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

FIG. 1 is a schematic diagram illustrating a communications system 100 where embodiments presented herein can be applied. The communications system 100 could be a third generation (3G) telecommunications system, a fourth generation (4G) telecommunications system, or a fifth (5G) telecommunications system and support any 3GPP telecommunications standard.

The communications system 100 comprises at least one network node 200 configured to provide network access to wireless devices 300a, 300b in a radio access network 110. The network node 200 provides network access in the radio access network 110 by transmitting signals to, and receiving signals from, the wireless devices 300a, 300b. The signals could be transmitted from, and received by, a TRP 205 at the network node 200. The TRP 205 could form an integral part of the network node 200 or be physically separated from the network node 200.

Examples of network nodes 200 include, but are not limited to, radio base stations, base transceiver stations, Node Bs, evolved Node Bs, gigabit Node Bs, access points, and access nodes. Examples of wireless devices 300a, 300b include, but are not limited to, mobile stations, mobile phones, handsets, wireless local loop phones, user equipment (UE), smartphones, laptop computers, tablet computers, sensors, modems, and network equipped vehicles, such as drones (or other aircrafts), land vehicles, and sea vessels. As the skilled person understands, the communications system 100 may comprise a plurality of network nodes 200, each providing network access, via one or more TRPs 205, to a plurality of wireless devices 300a, 300b. The herein disclosed embodiments are not limited to any particular number of network nodes 200 or wireless devices 300a, 300b.

The network node 200, or at least the TRP 205 (and, optionally, the wireless devices 300a, 300b), could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different wireless devices, different implementations will be needed. One drawback with an analog beamforming implementation is that transmission and reception can only be performed in one beam at a time.

The network node 200 is configured to, via the TRP 205, transmit signals to, and receive signals from, the wireless devices 300a, 300b using beams 140. In the illustrative example of FIG. 1, beam 140 represents a narrow, user-covering, beam. In this respect a user-covering beam covers only a fraction of a cell-covering beam, where the cell-covering beam covers at least a sector of the radio access network 110. Further, as the skilled person understands, the network node 200 could be configured to, via the TRP 205 transmit signals to, and receive signals from, the wireless devices 300a, 300b using either narrow or wide beams, depending on the need. The network node 200 is therefore assumed to be configured to perform beam management.

FIG. 2 schematically illustrates allocation of reference signals in a time/frequency grid 250 according to state of the art. FIG. 2 illustrates in which resource elements of a subframe covering two slots certain downlink reference signals (i.e., reference signals as transmitted from the network node 200 to the wireless devices 300a, 300b) are located. Each resource element spans a frequency interval of 15 kHz, corresponding to one sub-carrier, and a time interval of 0.5 ms, corresponding to one orthogonal frequency-division multiplexing (OFDM) symbol. A resource block is 180 kHz wide in frequency (thus corresponding to 12 sub-carriers) and 1 slot long in time. The types of reference signals shown in FIG. 2 are PSS (primary synchronization signal), SSS (secondary synchronization signal), CRS (cell-specific reference signal), PRS (positioning reference signal), CSI-RS (channel state information reference signal), and DMRS (demodulation reference signal). From FIG. 2 follows that the reference signals span the entire system bandwidth. One reason for this is to obtain a wideband sounding of the radio propagation channel between the TRP 205 and the wireless devices 300a, 300b served by the network node.

When performing a device-specific beam management procedures it might not always be optimal to use reference signals such as CSI-RS that span the entire system bandwidth. One reason for this is that the optimal beam might be different for different parts of the frequency band, and thus be different for different parts of the system bandwidth. This means that the optimal beam as selected based on reference signals transmitted over the entire system bandwidth and received by a particular wireless device 300a, 300b might be different compared to the optimal beam for the frequency band in which the particular wireless device 300a, 300b will be scheduled for data transmission. In the worst case, the beam selected based on reference signals transmitted over the entire system bandwidth will not work at all for the frequency band in which the particular wireless device 300a, 300b is actually scheduled.

The embodiments disclosed herein therefore relate to mechanisms for device-specific beam management of a wireless device 300a in a communications system 100 and device-specific beam management of a wireless device 300a in a communications system 100. In order to obtain such mechanisms there is provided a network node 200, a method performed by the network node 200, a computer program product comprising code, for example in the form of a computer program, that when run on processing circuitry of the network node 200, causes the network node 200 to perform the method. In order to obtain such mechanisms there is further provided a wireless device 300*a*, 300*b*, a method performed by the wireless device 300*a*, 300*b*, and a computer program product comprising code, for example in the form of a computer program, that when run on processing circuitry of the wireless device 300*a*, 300*b*, causes the wireless device 300*a*, 300*b* to perform the method.

Figure 4:
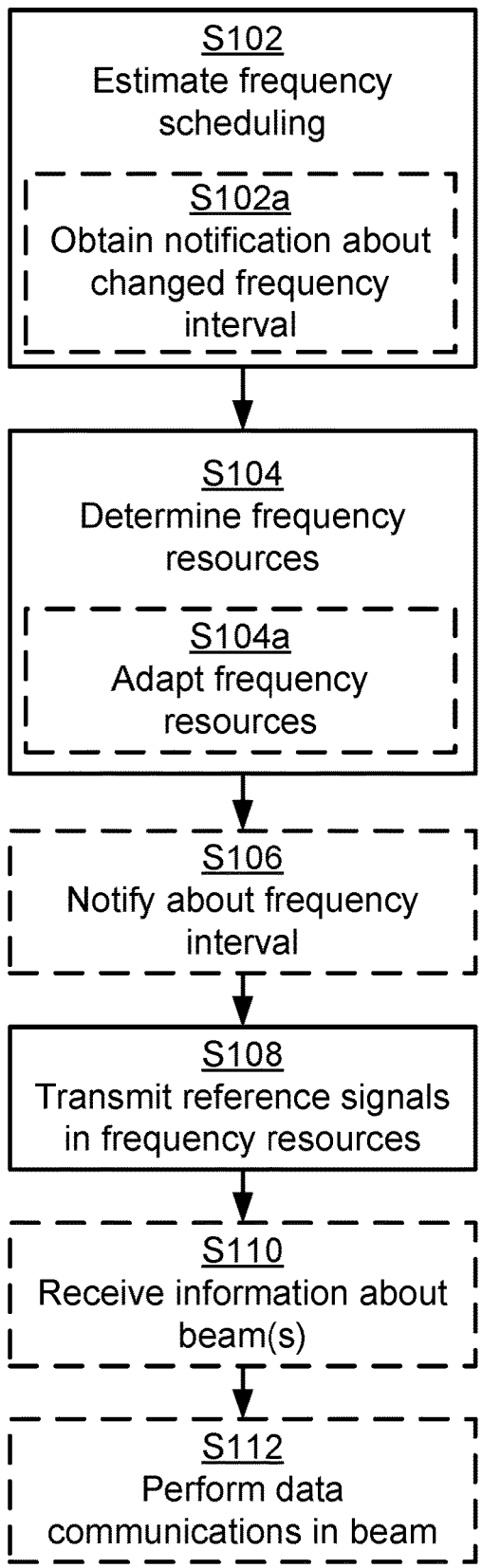
Figure 6:
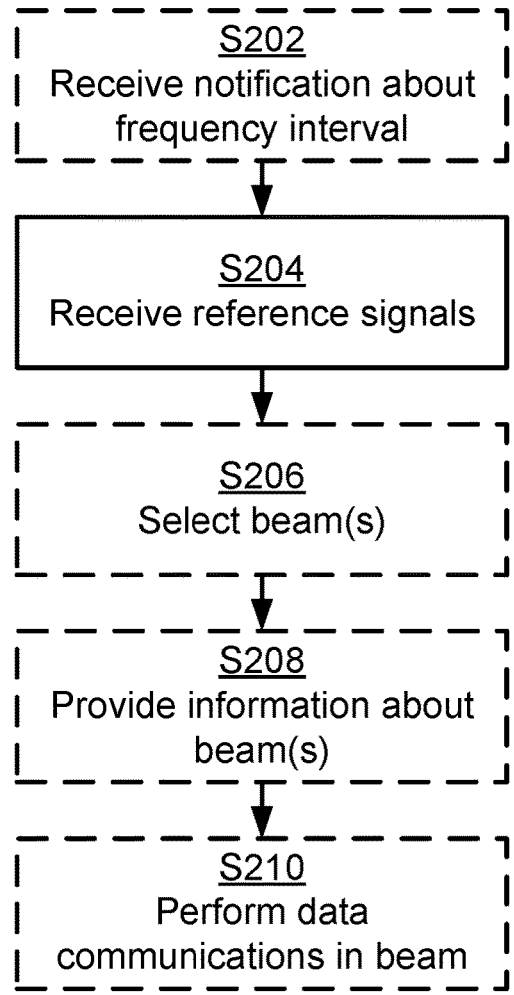

FIGS. 3 and 4 are flowcharts illustrating embodiments of methods for device-specific beam management of a wireless device 300*a* in a communications system 100 as performed by the network node 200. FIGS. 5 and 6 are flowcharts illustrating embodiments of methods for device-specific beam management of a wireless device 300*a* in a communications system 100 as performed by the wireless device 300*a*, 300*b*. The methods are advantageously provided as computer programs 1320*a*, 1320*b*.

Reference is now made to FIG. 3 illustrating a method for device-specific beam management of a wireless device 300*a* in a communications system 100 as performed by the network node 200 according to an embodiment. The communications system 100 has a system bandwidth.

In general terms, the network node 200 is configured to adapt the frequency allocation of reference signals used for beam management based on the expected frequency scheduling for coming data transmissions. Hence, the network node 200 is configured to perform step S102:

S102: The network node 200 estimates frequency scheduling of the wireless device 300*a*. The frequency scheduling is to be used for data communications with the wireless device 300*a*. Generally the frequency scheduling relates to scheduling of resources in the frequency domain. In other words, the network node 200 thus estimates a frequency band in which the wireless device 300*a* is to be scheduled, wherein the frequency band is to be used for data communications with the wireless device 300*a*.

The network node 200 then, based on the estimated frequency scheduling, determines frequency resources to use for transmission of reference signals. Particularly, the network node 200 is configured to perform step S104:

S104: The network node 200 determines which frequency resources to use for transmission of reference signals to the wireless device 300*a*. The frequency resources match the estimated frequency scheduling and span less than the entire system bandwidth.

In this respect, a separate frequency scheduling and/or determination of frequency resource may be needed for each individual wireless device 300*a*, 300*b*. Once the frequency resources have been determined the reference signals are transmitted as part of device-specific beam management. Hence, the network node 200 is configured to perform step S108:

S108: The network node 200 transmits the reference signals in the determined frequency resources as part of device-specific beam management of the wireless device 300*a*.

Embodiments relating to further details of device-specific beam management of a wireless device 300*a* in a communications system 100 as performed by the network node 200 will now be disclosed.

There could be different examples of reference signals. Examples of reference signals that could be transmitted in step S108 include, but are not limited to, PSS, SSS, CRS, PRS, CSI-RS, DMRS, synchronization signals (SS) for new radio (or 5G) telecommunications systems, and SS block.

There could be different ways for the network node 200 to transmit the reference signals in step S108, such as with or without repetition. According to an embodiment the reference signals are transmitted in a set of transmit beams. That is, the network node 200 could thus be configured to perform a transmit beam sweep at the TRP 205 as part of the beam management procedure. Further, each of the reference signals could be transmitted multiple times in each transmit beam. That is, the wireless device 300*a* could thus be configured to perform a reception beam sweep as part of the beam management procedure. Further details related thereto will be disclosed below.

The frequency scheduling could relate to upcoming communications in either downlink or uplink. Particularly, according to an embodiment the frequency scheduling pertains to which frequency resources to use for at least one of downlink and uplink communications with the wireless device 300*a*. Hence, the frequency scheduling could pertains to which frequency resources to use for either only downlink communications, only uplink communications, or both downlink and uplink communications with the wireless device 300*a*.

There could be different ways to determine the frequency resources such that the frequency resources match the estimated frequency scheduling. In some aspects the frequency resources are determined so as to span the frequency interval in which the wireless device 300*a* is scheduled. That is, according to an embodiment the frequency resources are determined so as to cover a frequency interval in which the wireless device 300*a* is scheduled for data communications. Further aspect related thereto will be disclosed below with reference to FIG. 7.

There could be different factors that influence the estimated frequency scheduling in step S102. For example, the estimation could be based on the amount of buffered data for the wireless device 300*a*, the amount of buffered data for other wireless devices 300*b*, previous channel estimations, and/or latency requirements. Particularly, according to an embodiment the frequency scheduling is estimated based current buffer lengths at wireless devices 300*a*, 300*b* served by the network node 200, latency requirements for the wireless devices 300*a*, 300*b* served by the network node 200, and/or previously made channel estimations.

There could be different factors that trigger the device-specific beam management procedure. Particularly, according to an embodiment the network node 200 is triggered to perform the device-specific beam management of the wireless device 300*a* upon occurrence of an event, semi-persistently, or periodically. For example, in order to find suitable beams to be used at the TRP 205 (and optionally beams to be used at the wireless device 300*a*) the network node 200 could set up an aperiodic event triggered device-specific beam management procedure for the wireless device 300*a*. In another example a semi-persistent or periodic device-specific beam management procedure is already initiated for the wireless device 300*a*.

In view of the allocation of reference signals in the time/frequency grid 250 of FIG. 2, one way to adaptation the transmission of the reference signals according to the estimated frequency scheduling in step S102 is to null the output power of the unwanted sub-carriers. Particularly, according to an embodiment where the reference signals are transmitted on sub-carriers, the network node 200 is configured to nulling sub-carriers outside a frequency interval defined by the frequency scheduling.

Reference is now made to FIG. 4 illustrating methods for device-specific beam management of a wireless device 300*a* in a communications system 100 as performed by the network node 200 according to further embodiments. It is assumed that steps S102, S104, S108 are performed as described above with reference to FIG. 3 and a thus repeated description thereof is therefore omitted.

As disclosed above, in some aspects the reference signals are transmitted in beams according to a transmission beam sweep. The wireless device 300*a* could then identify which of the transmit beams that best fulfils a quality criterion. Particularly, according to an embodiment the device-specific beam management comprises the network node 200 to transmit the reference signals in a set of transmit beams in step S108 and the network node 200 is configured to perform step S110:

S110: The network node 200 receives, from the wireless device 300*a*, information identifying at least one of the beams in the set of transmit beams. This at least one of the transmit beams is by the wireless device 300*a* selected as best fulfilling a quality criterion at the wireless device 300*a*. Further details relating thereto will be disclosed below.

The network node 200 could then communicate with the wireless device 300*a* using the transmit beam as selected by the wireless device 300*a*. Particularly, according to an embodiment the network node 200 is configured to perform step S112:

S112: The network node 200 performs data communication with the wireless device 300*a* using one of the at least one of the transmit beams.

The network node 200 does not have to explicitly inform the wireless device 300*a* about the frequency allocation of the reference signals due to the fact that the wireless device 300*a* will just regard any unused frequency sub-carriers (or, generally, frequency sub-bands) as out of coverage (due to fading, for example). However, in other aspects the network node 200 explicitly informs the wireless device 300*a* about the frequency allocation of the reference signals. Hence, according to an embodiment the network node 200 is configured to perform step S106:

S106: The network node 200 notifies, before transmitting the reference signals in step S108, the wireless device 300*a* about a frequency interval defined by the frequency scheduling and in which the reference signals are to be transmitted.

When the estimated frequency scheduling for the wireless device 300*a* changes in either uplink or downlink a new frequency allocation of the reference signals could be determined and applied for the wireless device 300*a*. Hence, according to an embodiment the network node 200 is configured to perform steps S102*a* as part of step S102 and S104*a* as part of step S104:

S102*a*: The network node 200 obtains an indication of changed frequency scheduling of the wireless device 300*a*. In this respect the indication could be based on the same factors that influence the estimated frequency scheduling in step S102. That is, the indication could be based on updated buffer lengths at wireless devices 300*a*, 300*b* served by the network node 200, updated latency requirements for the wireless devices 300*a*, 300*b* served by the network node 200, and/or updates of previously made channel estimations.

S104*a*: The network node 200 adapts the frequency resources to use for transmission of reference signals to the wireless device 300*a* in accordance with the indication of changed frequency scheduling. In this respect step S104*a* is similar to step S104.

Reference is now made to FIG. 5 illustrating a method for device-specific beam management of a wireless device 300*a* in a communications system 100 as performed by the wireless device 300*a* according to an embodiment. The communications system 100 has a system bandwidth.

As disclosed above, the network node 200 in step S108 transmits reference signals to the wireless device 300*a*. It is assumed that the wireless device 300*a* receives the reference signals. Hence, the wireless device 300*a* is configured to perform step S204:

S204: The wireless device 300*a* receives reference signals from the network node 200 as part of device-specific beam management of the wireless device 300*a*. In accordance with what has been disclosed above, the reference signals are only received in frequency resources that span less than the entire system bandwidth. As disclosed above, the frequency resources match an estimated frequency scheduling of the wireless device 300*a* for data communications with the network node 200.

Embodiments relating to further details of device-specific beam management of a wireless device 300*a* in a communications system 100 as performed by the wireless device 300*a*, 300*b* will now be disclosed.

Reference is now made to FIG. 6 illustrating methods for device-specific beam management of a wireless device 300*a* in a communications system 100 as performed by the wireless device 300*a* according to further embodiments. It is assumed that step S204 is performed as described above with reference to FIG. 5 and a thus repeated description thereof is therefore omitted.

As disclosed above, the reference signals could by the network node 200 be transmitted in a set of transmit beams and the wireless device 300*a* could report back the best transmit beam. This allows the wireless device 300*a* to indicate which one of the transmit beams for the network node 200 to use for future data communications with the wireless device 300*a*. Particularly, the wireless device 300*a* is configured to perform steps S206 and S208:

S206: The wireless device 300*a* selects which at least one of the transmit beams that best fulfils a quality criterion based on the reference signals as received for each of the transmit beams.

S208: The wireless device 300*a* provides information identifying this at least one of the transmit beams to the network node 200.

The criterion used in step S206 could be based on the type of reference signal that is received. Typical examples of quality criterions are based on maximizing the throughput or data rate for the data communications between the network node 200 and the wireless device 300*a*, such as highest reference signal received power and highest reference signal received quality.

Further, as also disclosed above, each of the reference signals could be transmitted multiple times in each transmit beam. In an embodiment where each of the reference signals is transmitted multiple times in each transmit beam, the device-specific beam management could comprises the wireless device 300*a* to receive the reference signals in a set of receive beams. The wireless device 300*a* could then receive the reference signals at least one time in each receive beam for each transmit beam. This enables the wireless device 300*a* to receive the reference signals transmitted in each transmit beam multiple times and thereby allows the wireless device 300*a* to receive the reference signals transmitted in each transmit beam in multiple receive beams. The wireless device 300*a* could then select the best receive beams similar as in step S206.

The determined best transmit beam (and the best receive beam) could then be used for data transmission. Particularly, according to an embodiment the wireless device 300a is configured to perform step S210:

S210: The wireless device 300a performs data communication with the network node 200 towards one of the at least one of the transmit beams.

Further, ass disclosed above, in some aspects the network node 200 explicitly informs the wireless device 300a about the frequency allocation of the reference signals. Hence, according to an embodiment the wireless device 300a is configured to perform step S202:

S202: The wireless device 300a receives, from the network node 200 and before receiving the reference signals in step S204, a notification about a frequency interval defined by the frequency scheduling and in which the reference signals are to be transmitted.

Figure 7:
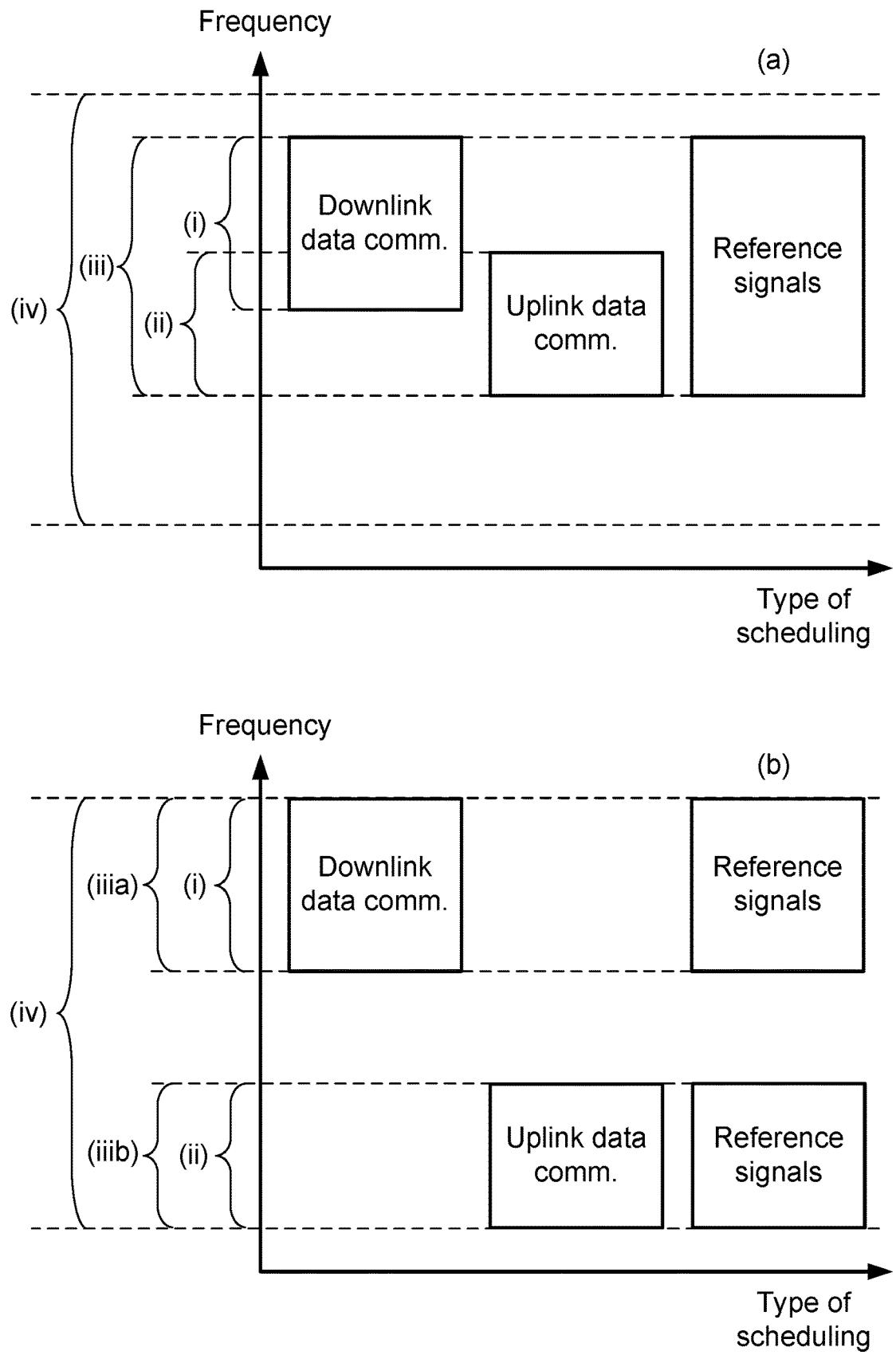
FIG. 7 is a schematic illustration of frequency allocation of reference signals according to embodiments.

FIG. 7 at (a) and (b) schematically illustrates two examples of frequency allocation of reference signals in accordance with the herein disclosed embodiments. In each of the examples the allocation of frequency resources for different type of scheduled communications between the network node 200 and the wireless device 300a are indicated along the entire system bandwidth (iv).

Particularly, the frequency resources for downlink data communications span a frequency band denoted (i), the frequency resources for uplink data communications span a frequency band denoted (ii), and the frequency resources for transmission of reference signals span a frequency band denoted (iii) in FIG. 7(a) and two frequency bands denoted (iiia) and (iiib) in FIG. 7(b). In both examples the frequency resources for transmission of reference signals span the frequency resources for downlink and uplink data communications but no other frequency resources. Thus, in both examples the frequency resources for transmission of reference signals span less than the entire system bandwidth (iv). Each block of frequency resources for transmission of reference signals could potentially comprise any of the types of reference signals shown in FIG. 2.

Figure 8:
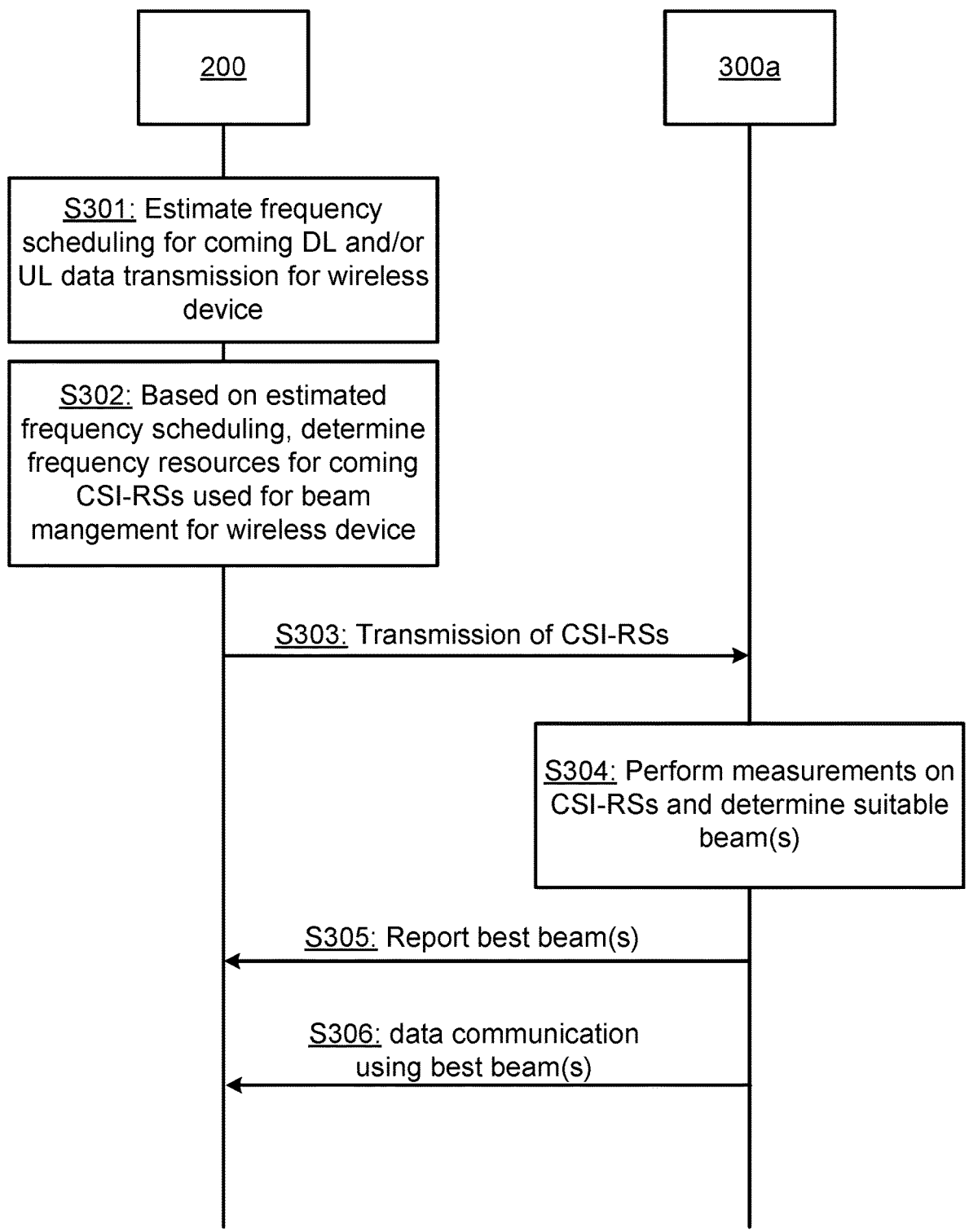
FIG. 8 is a signalling diagram according to an embodiment.

One particular embodiment for device-specific beam management of a wireless device 300a in a communications system 100 as performed by the network node 200 and the wireless device 300a based on at least some of the above disclosed embodiments will now be disclosed in detail with reference to the signalling diagram of FIG. 8.

S301: The network node 200 estimates the frequency scheduling for upcoming data transmission both in downlink and uplink for a targeted wireless device 300a. One way to implement step S301 is to perform any of step S102 and step S102a.

S302: The network node 200 determines which frequency resources to be allocated for the reference signals to be used during the beam management procedure based on the estimated frequency scheduling for the upcoming data transmission in downlink and uplink for the wireless device 300a. One way to implement step S302 is to perform any of step S104 and step S104a.

S303: The network node 200 transmits the reference signals using the frequency resources. The reference signals are received by the wireless device 300a. One way to implement step S303 is to perform step S108 and step S204.

S304: The wireless device 300a performs measurements on the received reference signals. The wireless device 300a determines the best transmit beam (if a transmit beam sweep was included in the beam management procedure) and/or the best receive beam (if a receive beam sweep was included in the beam management procedure) based on the measurements. One way to implement step S304 is to perform step S206.

S305: The wireless device 300a reports back the best transmit beam (if a transmit beam sweep was included in the beam management procedure). The report is received by the network node 200. One way to implement step S305 is to perform step S110 and step S208.

S306: The network node 200 and the wireless device 300a use the determined best transmit beam (at the network node 200) and/or best receive beam (at the wireless device 300a) for data communications in downlink and/or uplink between the network node 200 and the wireless device 300a. One way to implement step S306 is to perform step S112 and step S210.

Figure 9:
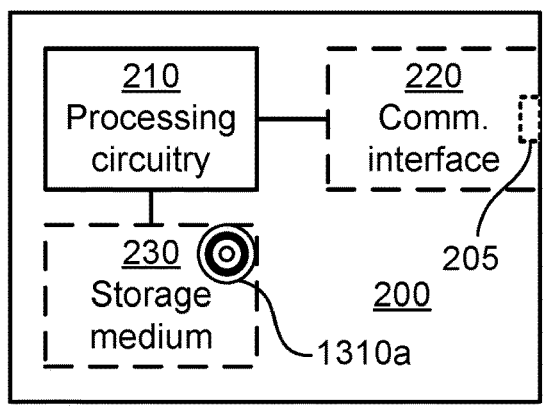
FIG. 9 is a schematic diagram showing functional units of a network node according to an embodiment.

FIG. 9 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310a (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S112, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with other entities, nodes, and devices of the communications system 100, and particular with the wireless devices 300a, 300b. As such the communications interface 220 may comprise one or more transmitters and receivers, comprising analogue and digital components.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 10:
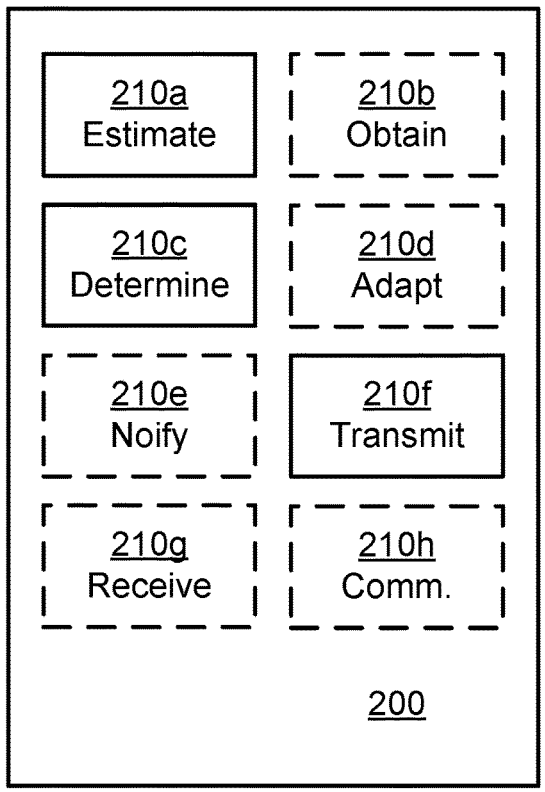
FIG. 10 is a schematic diagram showing functional modules of a network node according to an embodiment.

FIG. 10 schematically illustrates, in terms of a number of functional modules, the components of a network node 200 according to an embodiment. The network node 200 of FIG. 10 comprises a number of functional modules; an estimate module 210a configured to perform step S102, a determine module 210C configured to perform step S104, and a transmit module 210f configured to perform step S108. The network node 200 of FIG. 10 may further comprise a number of optional functional modules, such as any of an obtain module 210b configured to perform step S102a, an adapt module 210d configured to perform step S104a, a notify module 210e configured to perform step S106, a receive module 210g configured to perform step S110, and communications module 210*h* configured to perform step S112. In general terms, each functional module 210*a*-210*h* may be implemented in hardware or in software. Preferably, one or more or all functional modules 210*a*-210*h* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*-210*h* and to execute these instructions, thereby performing any steps of the network node 200 as disclosed herein.

The network node 200 may be provided as a standalone device or as a part of at least one further device. For example, as illustrated in FIG. 1 the network node 200 may be provided in a node of the radio access network no or in a node of the core network 120. Alternatively, functionality of the network node 200 may be distributed between at least two devices, or nodes. These at least two nodes, or devices, may either be part of the same network part (such as the radio access network no or the core network 120) or may be spread between at least two such network parts. Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 9 the processing circuitry 210 may be distributed among a plurality of devices, or nodes. The same applies to the functional modules 210*a*-210*h* of FIG. 10 and the computer program 1320*a* of FIG. 13 (see below).

Figure 11:
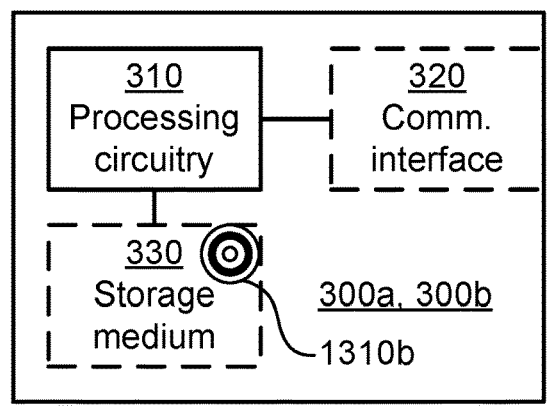
FIG. 11 is a schematic diagram showing functional units of a wireless device according to an embodiment.

FIG. 11 schematically illustrates, in terms of a number of functional units, the components of a wireless device 300*a*, 300*b* according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1310*b* (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the wireless device 300*a*, 300*b* to perform a set of operations, or steps, S202-S210, as disclosed above. For example, the storage medium 330 may store the set of operations, and the processing circuitry 310 may be configured to retrieve the set of operations from the storage medium 330 to cause the wireless device 300*a*, 300*b* to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The wireless device 300*a*, 300*b* may further comprise a communications interface 320 for communications with other entities, nodes, and devices of the communications system 100, and particular with the network node 200. As such the communications interface 320 may comprise one or more transmitters and receivers, comprising analogue and digital components.

The processing circuitry 310 controls the general operation of the wireless device 300*a*, 300*b* e.g. by sending data and control signals to the communications interface 320 and the storage medium 330, by receiving data and reports from the communications interface 320, and by retrieving data and instructions from the storage medium 330. Other components, as well as the related functionality, of the wireless device 300*a*, 300*b* are omitted in order not to obscure the concepts presented herein.

Figure 12:
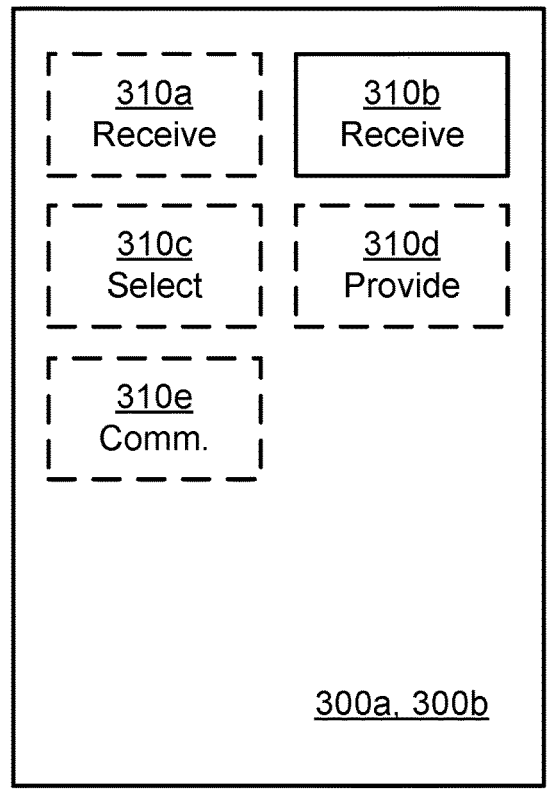
FIG. 12 is a schematic diagram showing functional modules of a wireless device according to an embodiment.

FIG. 12 schematically illustrates, in terms of a number of functional modules, the components of a wireless device 300*a*, 300*b* according to an embodiment. The wireless device 300*a*, 300*b* of FIG. 12 comprises a receive module 310*b* configured to perform step S204. The wireless device 300*a*, 300*b* of FIG. 12 may further comprise a number of optional functional modules, such as any of a receive module 310*a* configured to perform step S202, a select module 310*c* configured to perform step S206, a provide module 310*d* configured to perform step S208, and a communications module 310*e* configured to perform step S210. In general terms, each functional module 310*a*-310*e* may be implemented in hardware or in software. Preferably, one or more or all functional modules 310*a*-310*e* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*-310*e* and to execute these instructions, thereby performing any steps of the wireless device 300*a*, 300*b* as disclosed herein.

Figure 13:
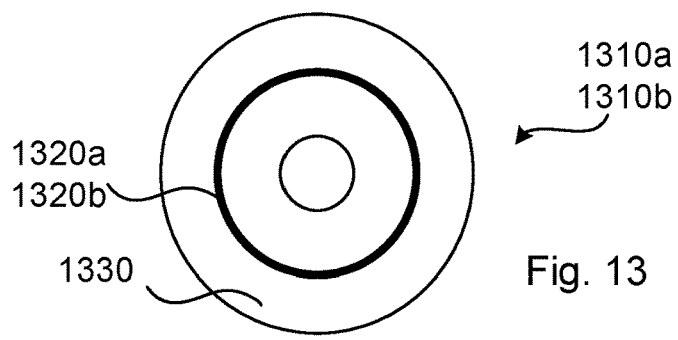
FIG. 13 shows one example of a computer program product comprising computer readable means according to an embodiment.

FIG. 13 shows one example of a computer program product 1310*a*, 1310*b* comprising computer readable means 1330. On this computer readable means 1330, a computer program 1320*a* can be stored, which computer program 1320*a* can cause the processing circuitry 210 and thereto operatively coupled entities and devices, such as the communications interface 220 and the storage medium 230, to execute methods according to embodiments described herein. The computer program 1320*a* and/or computer program product 1310*a* may thus provide means for performing any steps of the network node 200 as herein disclosed. On this computer readable means 1330, a computer program 1320*b* can be stored, which computer program 1320*b* can cause the processing circuitry 310 and thereto operatively coupled entities and devices, such as the communications interface 320 and the storage medium 330, to execute methods according to embodiments described herein. The computer program 1320*b* and/or computer program product 1310*b* may thus provide means for performing any steps of the wireless device 300*a*, 300*b* as herein disclosed.

In the example of FIG. 13, the computer program product 1310*a*, 1310*b* is illustrated as an optical disc, such as a CD (compact disc) or a DVD (digital versatile disc) or a Blu-Ray disc. The computer program product 1310*a*, 1310*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320*a*, 1320*b* is here schematically shown as a track on the depicted optical disk, the computer program 1320*a*, 1320*b* can be stored in any way which is suitable for the computer program product 1310a, 1310b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for device-specific beam management of a wireless device in a communications system having a system bandwidth, the method being performed by a network node, the method comprising:
determining, based on scheduling information for the wireless device, a set of adjacent sub-carriers that are expected to be used in a transmission of data to or from the wireless device, wherein the set of adjacent sub-carriers spans less than the entire system bandwidth and the data is not a reference signal;
after determining the set of adjacent sub-carriers, selecting, from among the determined set of adjacent sub-carriers that are expected to be used in the transmission of the non-reference signal data to or from the wireless device, a first set of one or more sub-carriers to use for transmission of one or more reference signals to the wireless device such that each sub-carrier of the selected first set of sub-carriers is included in the determined set of adjacent sub-carriers, wherein said one or more reference signals are not demodulation reference signals (DMRS); and
transmitting the reference signals using the selected sub-carriers as part of the device-specific beam management of the wireless device.

2. The method of claim 1, wherein the device-specific beam management comprises transmitting the reference signals in a set of beams, the method further comprising:
receiving, from the wireless device, information identifying at least one of the beams in the set of beams, said at least one of the beams being selected as best fulfilling a quality criterion at the wireless device.

3. The method of claim 2, further comprising:
performing data communication with the wireless device using one of said at least one of the beams.

4. The method of claim 1, wherein the reference signals are transmitted in a set of transmit beams, and wherein each of the reference signals is transmitted multiple times in each transmit beam.

5. The method of claim 1, further comprising:
after transmitting the reference signals using the selected sub-carriers, transmitting or receiving the non-reference signal data using a second set of one or more sub-carriers, wherein the first set of sub-carriers and the second set of sub-carriers at least partially overlap.

6. The method of claim 1, wherein determining the set of adjacent sub-carriers comprises determining the set of adjacent sub-carriers based on current buffer lengths at wireless devices served by the network node and/or latency requirements for the wireless devices served by the network node.

7. The method of claim 1, wherein the reference signals are transmitted on the selected sub-carriers, and wherein sub-carriers outside a frequency interval defined by the selected sub-carriers are nulled.

8. The method of claim 1, further comprising:
notifying, before transmitting the reference signals, the wireless device about a frequency interval defined by the selected sub-carriers in which the reference signals are to be transmitted.

9. The method of claim 1, further comprising:
obtaining an indication of changed frequency scheduling of the wireless device; and
adapting sub-carriers to use for transmission of reference signals to the wireless device in accordance with the indication of changed frequency scheduling.

10. A computer program product comprising a non-transitory computer readable medium storing a computer program for device-specific beam management of a wireless device in a communications system having a system bandwidth, the computer program comprising computer code which, when run on processing circuitry of a network node, causes the network node to perform the method of claim 1.

11. The method of claim 1, wherein determining the set of adjacent sub-carriers comprises determining the set of adjacent sub-carriers based on current buffer lengths at wireless devices served by the network node.

12. The method of claim 1, further comprising:
transmitting to the wireless device information regarding the selected first set of one or more sub-carriers.

13. The method of claim 1, wherein said one or more reference signals are channel state information reference signals (CSI-RSSs).

14. The method of claim 1, wherein determining the set of adjacent sub-carriers is further based on latency requirement for the wireless device and/or previous channel estimation.

15. The method of claim 1, wherein
transmitting the reference signals using the selected sub-carriers as part of the device-specific beam management of the wireless device comprises transmitting the reference signals using a set of beams, which comprises transmitting (i) a first reference signal using a first transmit (TX) beam and (ii) a second reference signal using a second TX beam,
the method further comprises receiving, from the wireless device, a beam report identifying at least one of beams included in the set of beams, and
the device-specific beam management comprises, based on the received beam report, selecting one of beams included in the set of beams as a TX beam for transmitting the non-reference signal data.

16. A method for device-specific beam management of a wireless device in a communications system having a system bandwidth, the method being performed by the wireless device, the method comprising:
receiving reference signals from a network node as part of the device-specific beam management of the wireless device, wherein
the reference signals are not demodulation reference signals (DMRS),
a set of adjacent sub-carriers that are expected to be used in a transmission of data to or from the wireless device is determined based on scheduling information for the wireless device, the set of adjacent sub-carriers spans less than the entire system bandwidth,
the data is not a reference signal, and
after the set of adjacent sub-carriers is determined, a first set of one or more sub-carriers to use for transmission of the reference signals to the wireless device is selected from among the determined set of adjacent sub-carriers that are expected to be used in the transmission of the non-reference signal data to or from the wireless device such that each sub-carrier of the selected first set of sub-carriers is included in the determined set of the adjacent sub-carriers.

17. The method of claim 16, wherein the reference signals are transmitted by the network node in a set of transmit beams.

18. The method of claim 17, further comprising:
selecting at least one of the transmit beams that best fulfils a quality criterion based on the reference signals as received for each of the transmit beams; and
providing information identifying said at least one of the transmit beams to the network node.

19. The method of claim 18, further comprising:
after receiving the reference signals using the selected sub-carriers, transmitting or receiving the non-reference signal data using a second set of one or more sub-carriers, wherein the first set of sub-carriers and the second set of sub-carriers at least partially overlap.

20. The method of claim 17, wherein each of the reference signals is transmitted multiple times in each of the transmit beams, wherein the device-specific beam management comprises the wireless device receiving the reference signals in a set of receive beams, and wherein the reference signals are received at least one time in each of the receive beams for each of the transmit beams.

21. The method of claim 16, further comprising:
before receiving the reference signals, receiving, from the network, a notification about a frequency interval defined by the determined set of adjacent sub-carriers in which the reference signals are to be transmitted.

22. A computer program product comprising a non-transitory computer readable medium storing a computer program for device-specific beam management of a wireless device in a communications system having a system bandwidth, the computer program comprising computer code which, when run on processing circuitry of the wireless device, causes the wireless device to perform the method of claim 16.

23. A network node for device-specific beam management of a wireless device in a communications system having a system bandwidth, the network node comprising:
a transmitter; and
processing circuitry coupled to the transmitter, the processing circuitry being configured to cause the network node to:
determine, based on scheduling information for the wireless device, a set of adjacent sub-carriers that are expected to be used in a transmission of data to or from the wireless device, wherein the set of adjacent sub-carriers spans less than the entire system bandwidth and the data is not a reference signal;
after determining the set of adjacent sub-carriers, select, from among the determined set of adjacent sub-carriers that are expected to be used in the transmission of the non-reference signal data to or from the wireless device, a first set of one or more sub-carriers to use for transmission of one or more reference signals to the wireless device such that each sub-carrier of the selected first set of sub-carriers is included in the determined set of adjacent sub-carriers, wherein said one or more reference signals are not demodulation reference signals (DMRS); and
triggering the transmitter to transmit the reference signals using the selected sub-carriers as part of the device-specific beam management of the wireless device.

24. A wireless device for device-specific beam management of the wireless device in a communications system having a system bandwidth, the wireless device comprising:
a receiver; and
processing circuitry coupled to the receiver, the processing circuitry being configured to cause the wireless device to:
receive reference signals from a network node as part of the device-specific beam management of the wireless device, wherein
the reference signals are not demodulation reference signals (DMRS),
a set of adjacent sub-carriers that are expected to be used in a transmission of data to or from the wireless device is determined based on scheduling information for the wireless device,
the set of adjacent sub-carriers spans less than the entire system bandwidth,
the data is not a reference signal, and
after the set of adjacent sub-carriers is determined, a first set of one or more sub-carriers to use for transmission of the reference signals to the wireless device is selected from among the determined set of adjacent sub-carriers that are expected to be used in the transmission of the non-reference signal data to or from the wireless device such that each sub-carrier of the selected first set of sub-carriers is included in the determined set of the adjacent sub-carriers.

* * * * *